Patented Dec. 20, 1949

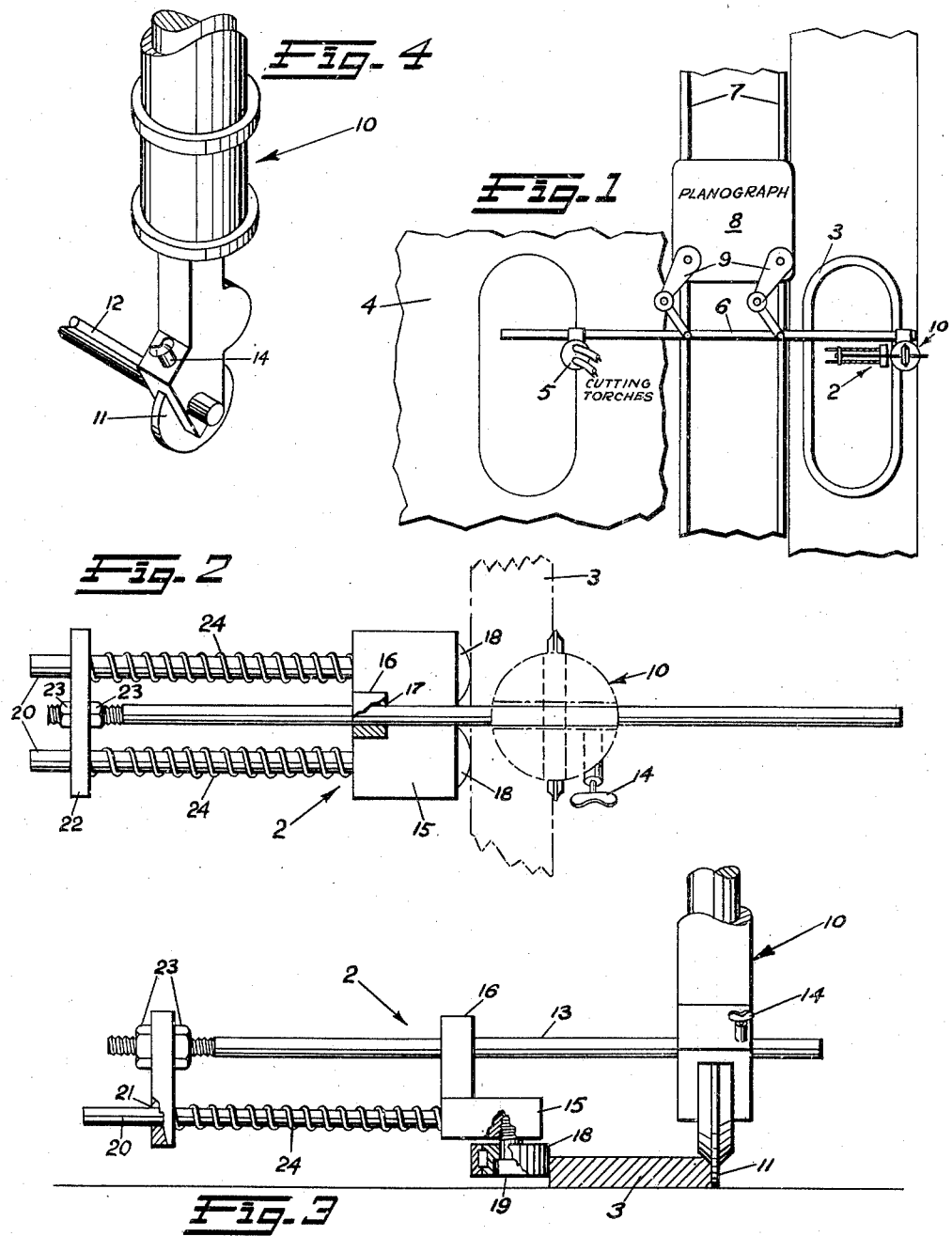

2,491,469

UNITED STATES PATENT OFFICE 2,491,469

PLANOGRAPH TRACER GUIDE

George Andersen, New York, N. Y.

Application May 11, 1945, Serial No. 593,179

4 Claims. (Cl. 33—23)

(Granted under the act of March 3, 1883, as amended April 30, 1928; 370 O. G. 757)

This invention relates to an improvement in the template tracer of a planograph or travograph machine for oxy-acetylene cutting.

An object of this invention is to provide a guide device that can readily be attached to the template tracer of a planograph and that will permit mechanical engagement of said template tracer with the template pattern.

Another object is to provide an attachment to the template tracer of a planograph that will eliminate the necessity for manual control of the template tracer and dispense with the continual presence of an operator.

A further object is to increase the speed and accuracy of burning in an oxy-acetylene cutting system.

Further objects and advantages of this invention, as well as its construction, arrangement and operation, will be apparent from the following description and claims in connection with the accompanying drawings, in which Fig. 1 is a plan view of a portion of a planograph machine equipped for oxy-acetylene cutting incorporating a template tracer and illustrating the general arrangement of follower, template, and work being cut;

Fig. 2 is a plan view of the guide device comprising the invention attached to the template tracer of a planograph;

Fig. 3 is a side elevation of the structure shown in Fig. 2; and

Fig. 4 is a view in perspective showing the template tracer device of the planograph machine.

Fig. 1 shows the general arrangement of a planograph machine set up for oxy-acetylene cutting including a template 3, template tracer 10 and guide device 2, and the work 4 being cut. The planograph includes a sliding carriage 8 mounted on rails 7 and an operating arm 6 secured to the carriage 8 by a pair of parallel motion links 9. The tracer 10 for the motor driven template is mounted on one end of the operating arm 6 and is caused to engage the template designated as 3. The other end of this arm carries the cutting torches 5 above the metal being cut. The general arrangement of the planograph is well known and does not require further explanation.

A preferred embodiment of the present invention comprises a guide device generally designated as 2 in Fig. 1, made accessory to the template tracer 10. The template tracer, shown in perspective in Fig. 4, forms part of the standard structure of the planograph and includes a motor-driven drive wheel 11 mounted rotatably on a shaft 12. Said shaft 12 is mounted removably in the frame of the template tracer 10, and secured therein by a clamp screw 14. The device comprising the invention is attached to the template tracer 10 of the planograph, by replacing the standard drive-wheel shaft 12 with an elongated rod 13, as in Figs. 2 and 3, mounted slidably in the frame of the template tracer 10 and projecting laterally therefrom to provide a slideway for the slide shoe 15. The clamp screw 14 secures the rod 13 in a selected position of adjustment. The slide shoe 15 includes a bearing plate 16, bored as at 17 to receive slidingly the rod 13. Guide rollers 18 are mounted on the base of the slide shoe 15, by means of axles that can be in the form of shoulder screws 19. These rollers are shown to be of standard ball or roller bearing construction but it is to be understood that any well known wheel or slide construction can be used. Spring guides 20—20 project laterally from the base of the slide shoe 15 and are received slidably in bores 21 in an end plate 22 fixed to the free end of the rod 13 by the adjusting nuts 23—23. Compression springs 24—24 are mounted on the spring guides 20—20 and are confined between the slide shoe 15 and the end plate 22 respectively.

Obviously many mechanical modifications of the structure disclosed in Figs. 2 and 3 could be employed. For example, a single spring mounted directly on the rod 13 could be used. The slide shoe can be made in a variety of configurations and a fixed sliding shoe could readily be substituted for the guide roller wheels 18.

The guide device is mounted on the motor-driven template tracer so that the guide rollers 18 and the drive wheel 11 of the template tracer 10 straddle the template 3 as shown in Fig. 3 of the drawings. To accomplish this, it is only necessary to retract the slide shoe 15, position the device and then allow the shoe 15 to snap into position with the rollers 18 abutting the edge of the template whereupon the tension of the springs 24—24 firmly holds the template tracer 10 against the edge of the template.

The motor-drive (not shown) on the motor driven template tracer 10 can now be started, actuating the drive wheel 11. No further attention on the part of the operator is required until the template tracer has completed its trace and the burn out completed, as the mechanical engagement of the guide device on the template obviates the necessity of manual engagement of the template tracer on the template. The operator is thus free to set up another work job. The saving in time and labor is obvious.

The mechanical contact of the template tracer 10 against the template, obtained by using the guide device 2, results in greater work accuracy than is obtained when the drive wheel on the template tracer is manually guided on the template. Any variation in the manual pressure due to fatigue or occasional carelessness on the part of the operator in the latter method often results in work discrepancies with the resulting loss of material and time.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A guide device for attachment to the template tracer of a planograph comprising a rod adjustably mounted on the template tracer whereby it may be positioned to extend a plurality of distances from said tracer, a slide shoe carried on the rod, an end plate fixed to the rod, guide means secured to the slide shoe and slidingly supported in the end plate and elastic means on the guide means to releasably hold the slide shoe against a template.

2. A guide device for attachment to the template tracer of a planograph comprising a rod mounted adjustably on said tracer whereby it can be positioned to extend a plurality of distances from said tracer, a slide shoe carried on said rod, an end plate fixed to said rod, a guide rod secured to said slide shoe and supported slidingly in said end plate, and a spring carried on said guide rod to hold said slide shoe releasably against a template.

3. A guide device for attachment to the template tracer of a planograph comprising a rod mounted adjustably on said tracer whereby it can be positioned to extend a plurality of distances from said tracer, a slide shoe carried on said rod, an end plate fixed to said rod, a plurality of guide rods secured to said slide shoe and supported slidingly in said end plate, and springs carried on each of said guide rods to hold said slide shoe releasably against a template.

4. A guide device for attachment to the template tracer of a planograph comprising a rod mounted adjustably on said tracer whereby it can be positioned to extend a plurality of distances from said tracer, a slide shoe carried on said rod, said shoe carrying a plurality of rollers, an end plate fixed to said rod, a guide rod secured to said slide shoe and supported slidingly in said end plate, and a spring carried on said guide rod to hold said rollers releasably against a template.

GEORGE ANDERSEN.

REFERENCES CITED

The following references are of record in the file of this patent:

UNITED STATES PATENTS

| Number | Name | Date |
|---|---|---|
| 1,172,933 | Bucknam | Feb. 22, 1916 |
| 1,763,793 | Krebs | June 17, 1930 |
| 1,861,758 | Shippy | June 7, 1932 |
| 1,928,015 | Grow | Sept. 26, 1933 |
| 2,130,373 | Anderson | Sept. 20, 1938 |
| 2,156,847 | Gregory | May 2, 1939 |
| 2,393,474 | Jones | Jan. 22, 1946 |